United States Patent
Stamps et al.

(10) Patent No.: US 11,214,361 B2
(45) Date of Patent: Jan. 4, 2022

(54) VIBRATION ATTENUATOR

(71) Applicant: Bell Helicopter Textron Inc., Fort Worth, TX (US)

(72) Inventors: Frank Bradley Stamps, Colleyville, TX (US); David Heverly, Arlington, TX (US); Michael R. Smith, Colleyville, TX (US); Michael Scott Seifert, Southlake, TX (US); Thomas C. Parham, Jr., Colleyville, TX (US); Gary Miller, North Richland Hills, TX (US); Jouyoung Jason Choi, Southlake, TX (US); Richard E. Rauber, Colleyville, TX (US)

(73) Assignee: Textron Innovations Inc., Providence, RI (US)

( * ) Notice: Subject to any disclaimer, the term of this patent is extended or adjusted under 35 U.S.C. 154(b) by 450 days.

(21) Appl. No.: 16/197,761

(22) Filed: Nov. 21, 2018

(65) Prior Publication Data

US 2020/0156773 A1    May 21, 2020

(51) Int. Cl.
*B64C 27/00*    (2006.01)
(52) U.S. Cl.
CPC ...... *B64C 27/001* (2013.01); *B64C 2027/003* (2013.01); *B64C 2027/005* (2013.01)
(58) Field of Classification Search
CPC ............ B64C 27/001; B64C 2027/003; B64C 2027/005
See application file for complete search history.

(56) References Cited

U.S. PATENT DOCUMENTS

| 4,239,456 A | 12/1980 | Joglekar et al. |
| 5,163,336 A * | 11/1992 | Biondetti ................ B06B 1/162 |
| | | 74/61 |
| 5,372,478 A | 12/1994 | McCafferty |

(Continued)

FOREIGN PATENT DOCUMENTS

WO    2015109089 A1    7/2015

OTHER PUBLICATIONS

European Exam Report in related European Patent Application No. 19210378.6 dated Aug. 3, 2020, 8 pages.
(Continued)

*Primary Examiner* — Richard G Davis
(74) *Attorney, Agent, or Firm* — Lightfoot & Alford PLLC

(57) ABSTRACT

A vibration attenuator for an aircraft has first and second coaxial spinners configured for rotation about a mast axis and relative to a rotor. Upper and lower weights of each spinner are spaced radially from the axis and positioned 180 degrees from each other about the axis. The weights of each spinner are spaced from each other a distance parallel to the mast axis, each weight rotating about the mast axis in a different plane. The spinners rotate together relative to the rotor at a selected angular rate and are selectively rotatable relative to each other between a minimum-moment configuration, in which the upper weight of each spinner is angularly aligned with the lower weight of the other spinner, and a maximum-moment configuration, in which the upper weights are angularly aligned and the lower weights are angularly aligned, producing a whirling moment about the mast axis as the spinners rotate.

21 Claims, 14 Drawing Sheets

(56) References Cited

U.S. PATENT DOCUMENTS

| | | | |
|---|---|---|---|
| 5,682,069 A | 10/1997 | Phillips et al. | |
| 7,958,801 B2 | 6/2011 | Frederickson | |
| 2011/0027081 A1* | 2/2011 | Jolly | F16F 15/223 416/1 |
| 2011/0259994 A1 | 10/2011 | Jolly et al. | |
| 2020/0198779 A1* | 6/2020 | Colombo | F16H 1/06 |

OTHER PUBLICATIONS

European Search Report in related European Patent Application No. 19210378.6 dated Jul. 23, 2020, 6 pages.
Partial European Search Report in related European Patent Application No. 19210378.6 dated Apr. 14, 2020, 14 pages.

* cited by examiner

VIBRATION ATTENUATOR

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

Rotary-wing aircraft, such as helicopters and tiltrotors, have at least one rotor for providing lift and propulsion forces, and these rotors have at least two airfoil blades connected to a rotatable hub. The rotor blades cause vibrations that are a function of the rotational speed of the rotor, and aircraft designers have difficulty accurately predicting the exact vibration modes that a particular rotor configuration will encounter. The vibrations, which can be caused by shear and/or moment forces, can be transmitted through the rotor mast, through associated powertrain components, and into the airframe of the aircraft. The vibrations can reduce the life of affected components and cause undesirable vibrations for passengers. Various types of vibration attenuation systems have been developed to reduce or eliminate these vibrations. The conventional systems can include airframe- and mast-mounted vibration attenuators.

DETAILED DESCRIPTION

In this disclosure, reference may be made to the spatial relationships between various components and to the spatial orientation of various aspects of components as the devices are depicted in the attached drawings. However, as will be recognized by those skilled in the art after a complete reading of this disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

A mast- or hub-mounted vibration attenuator is disclosed herein for reducing vibrations by producing a whirling moment opposing a moment created during operation of an aircraft rotor. The attenuator rotates relative to the rotor and uses at least two masses spaced from each other along a mast axis, such that the masses rotate in parallel planes. The masses are passively or actively positionable to configurations between and including a minimum-moment configuration, which produces a small moment or no moment, and a maximum-moment configuration. The attenuator preferably produces minimal shear forces during operation.

The attenuators disclosed herein are described as operating coaxially with the mast axis, which is the preferred installation on a rotor with blades that flap individually relative to the mast. However, when coupled to the yoke of a gimbaled rotor, the operational axis of the attenuator will deviate from being coaxial with the mast axis during gimbaling of the yoke.

Figure 1:
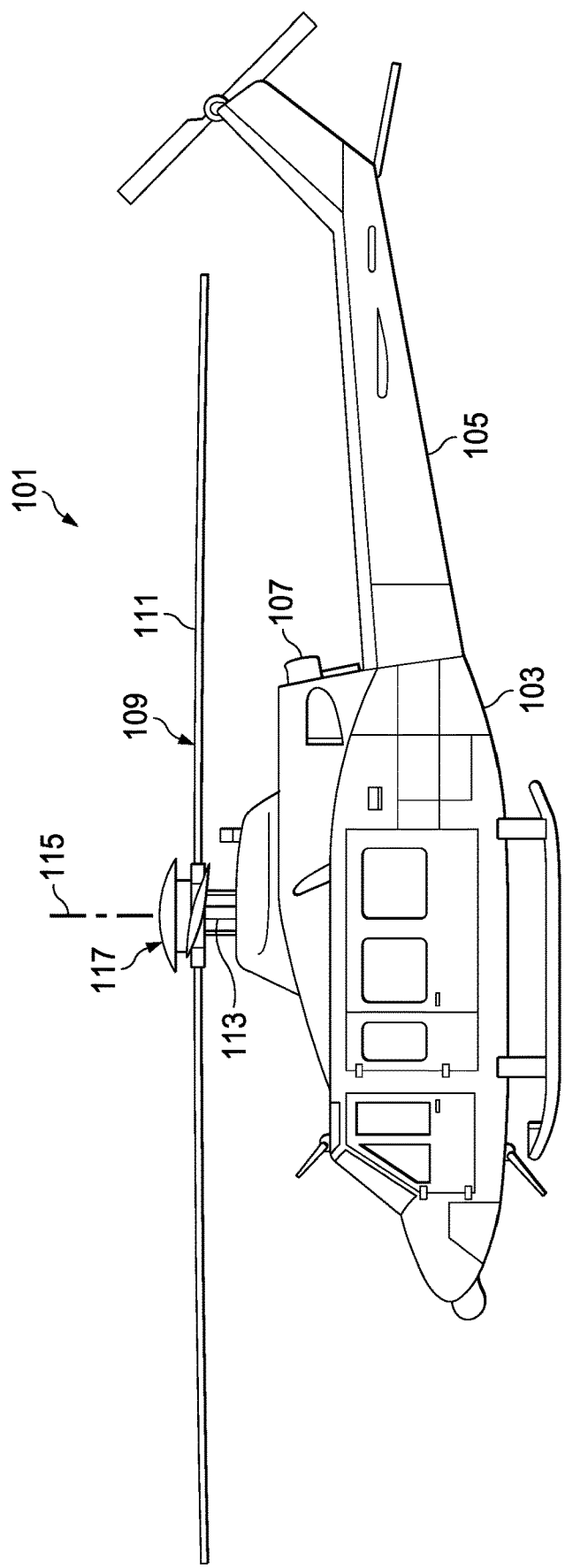
FIG. 1 is a side view of an aircraft comprising a vibration attenuator according to this disclosure.

FIG. 1 is a side view of a rotary-wing aircraft 101, comprising a fuselage 103, a tailboom 105, an engine 107, and main rotor 109 with blades 111. A mast 113 is coupled to engine 107, and rotor 109 is coupled to mast 113, with engine 107 providing torque for driving mast 113 and rotor 109 in rotation about mast axis 115. A vibration attenuator 117 according to this disclosure is coupled to rotor 109.

As shown, aircraft 101 is a Bell 412 helicopter, which is an example of an aircraft having a rotor that produces vibrations caused by two shear forces orbiting mast axis 115. During operation of rotor 109, bending of blades 111 can produce shear forces parallel to the plane of the rotor 109, and a moment can be produced if one blade 111 is bending upward and the opposite blade 111 is bending downward at an associated frequency. Unlike other rotor configurations that produce a whirling single shear force, the two shear forces produce a bending moment on mast 113, and the moment rotates about mast axis 115. This causes accelerations in the fuselage that are similar to those caused by a vertical shear force.

Mid-span weights carried by blades 111 can be used to minimize whirling moments, but a prior-art system (not shown) uses pendulums to oppose rotor vibrations. As disclosed in U.S. Pat. No. 4,239,456 to Joglekar, et al., each of a plurality of pendulums passively oscillates in a plane perpendicular to the plane of the rotor to create a couple for opposing moments. While the prior-art system reduces vibrations, the pendulums add a significant amount of mass to the rotor. Attenuators of this disclosure replace the prior-art system and have the advantages of having less mass and providing the capability of active control.

Figure 2:
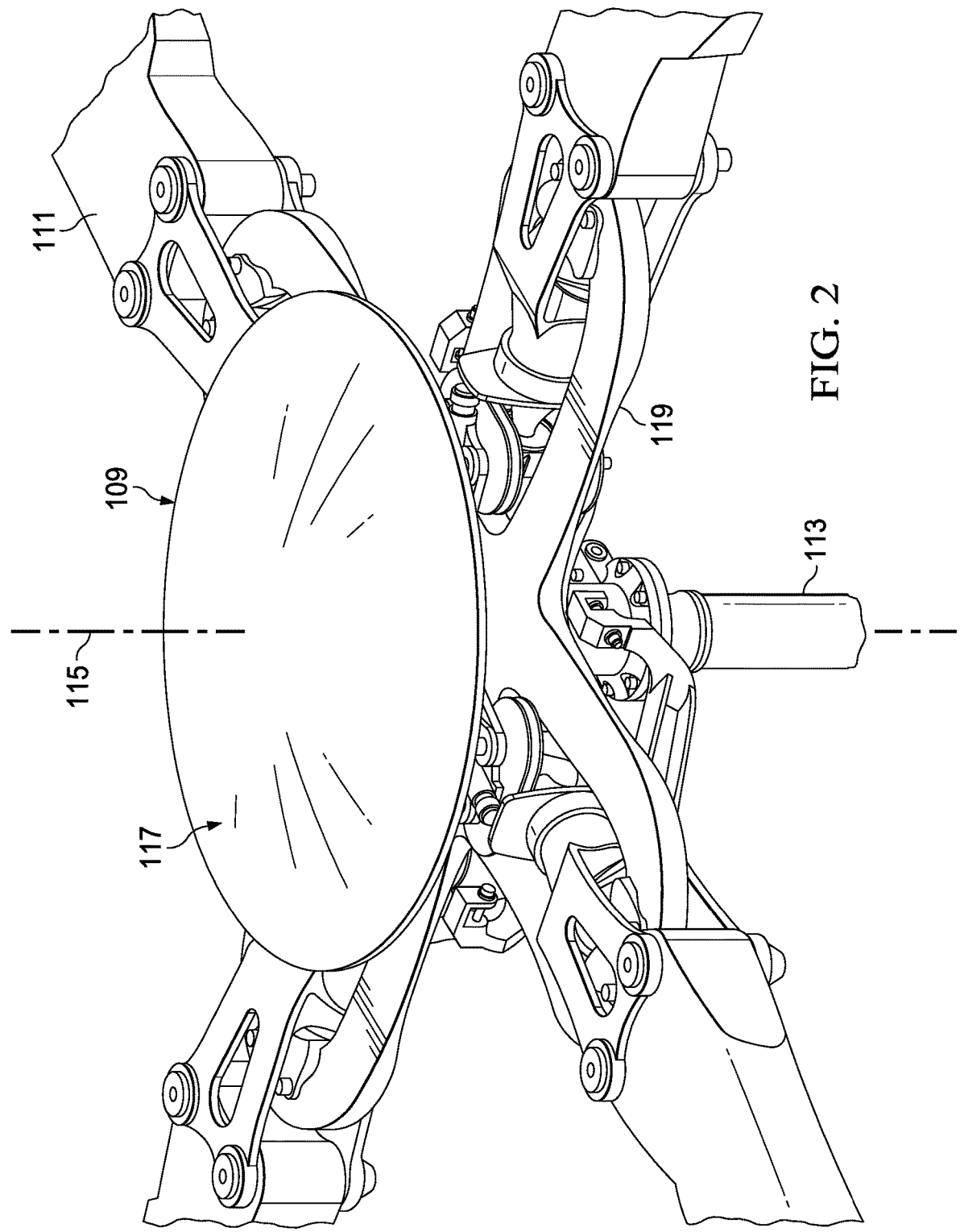
FIG. 2 is an oblique view of a portion of a rotor and mast assembly of the aircraft of FIG. 1.

FIG. 2 is an oblique view of portions of rotor 109 and mast 113, and the figure shows yoke 119 used to couple blades 111 to mast 113 and allow flapping of blades 111 through deformation of yoke 119. Though shown as having a configuration in which yoke 119 is rigidly mounted to mast 113, attenuator 117 may also be used with rotors having alternative configurations, including gimbaled rotors.

Figure 3:
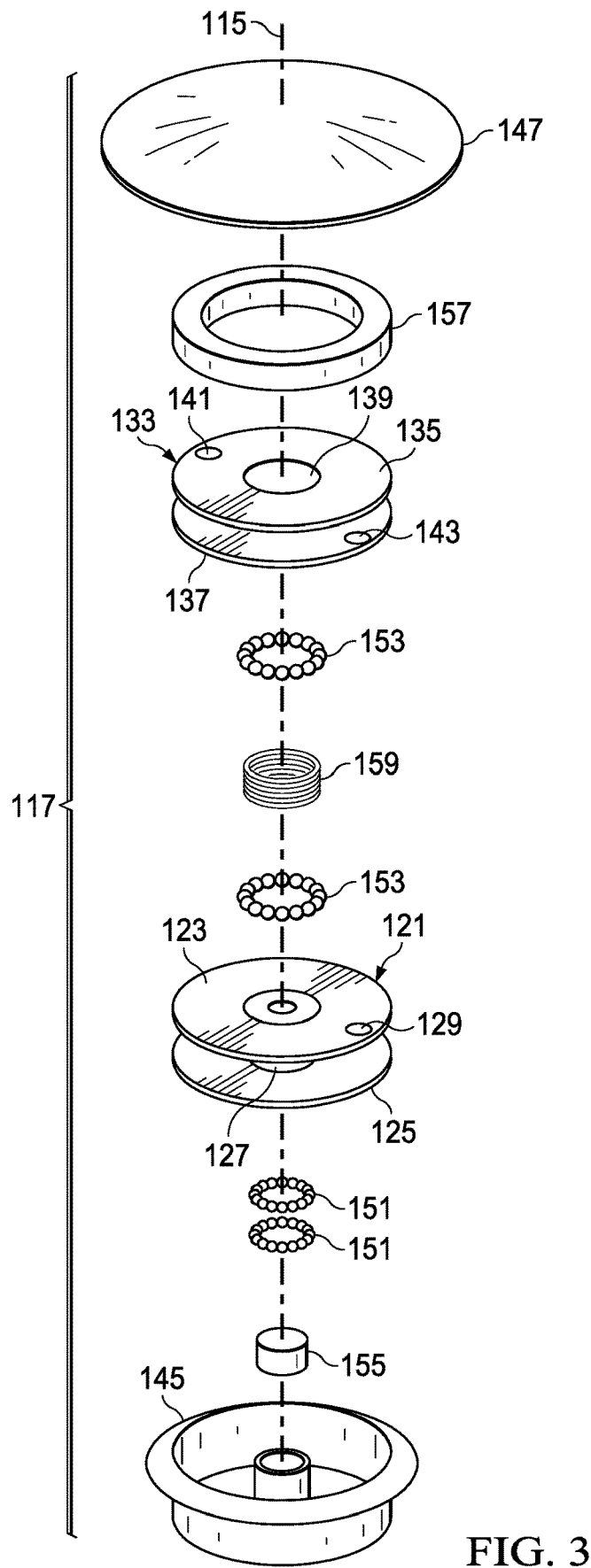
FIG. 3 is an oblique exploded view of the vibration attenuator of FIG. 1.
Figure 4:
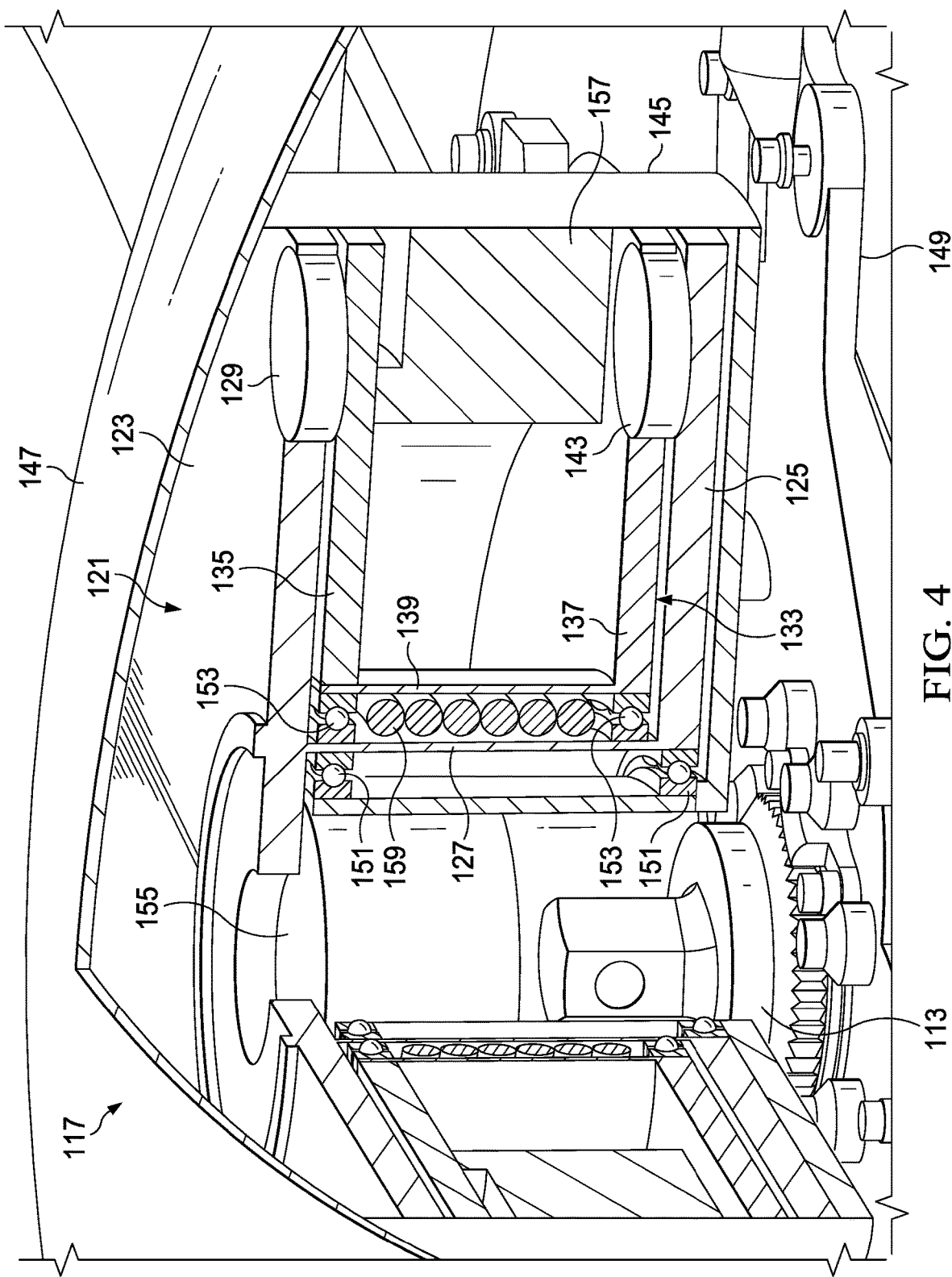
FIG. 4 is an oblique cutaway view of the vibration attenuator of FIG. 1.
Figure 5:
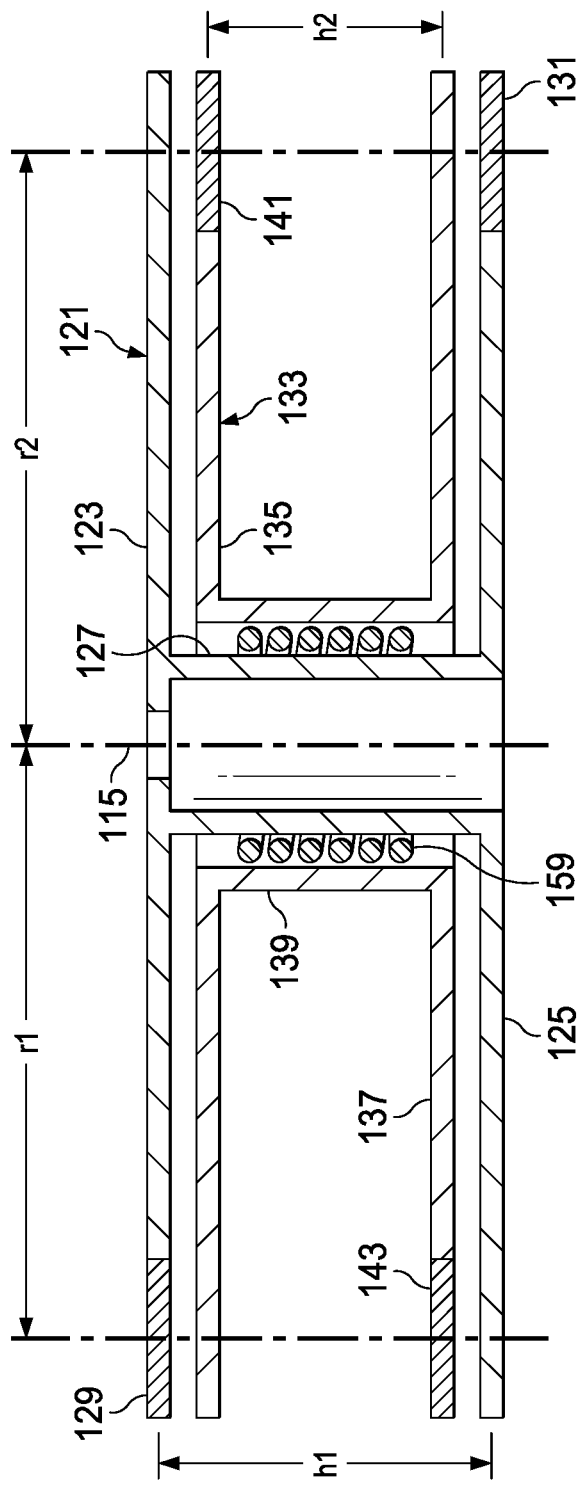
FIG. 5 is a simplified side cross-section view of the vibration attenuator of FIG. 1 in a minimum-moment configuration.
Figure 6:
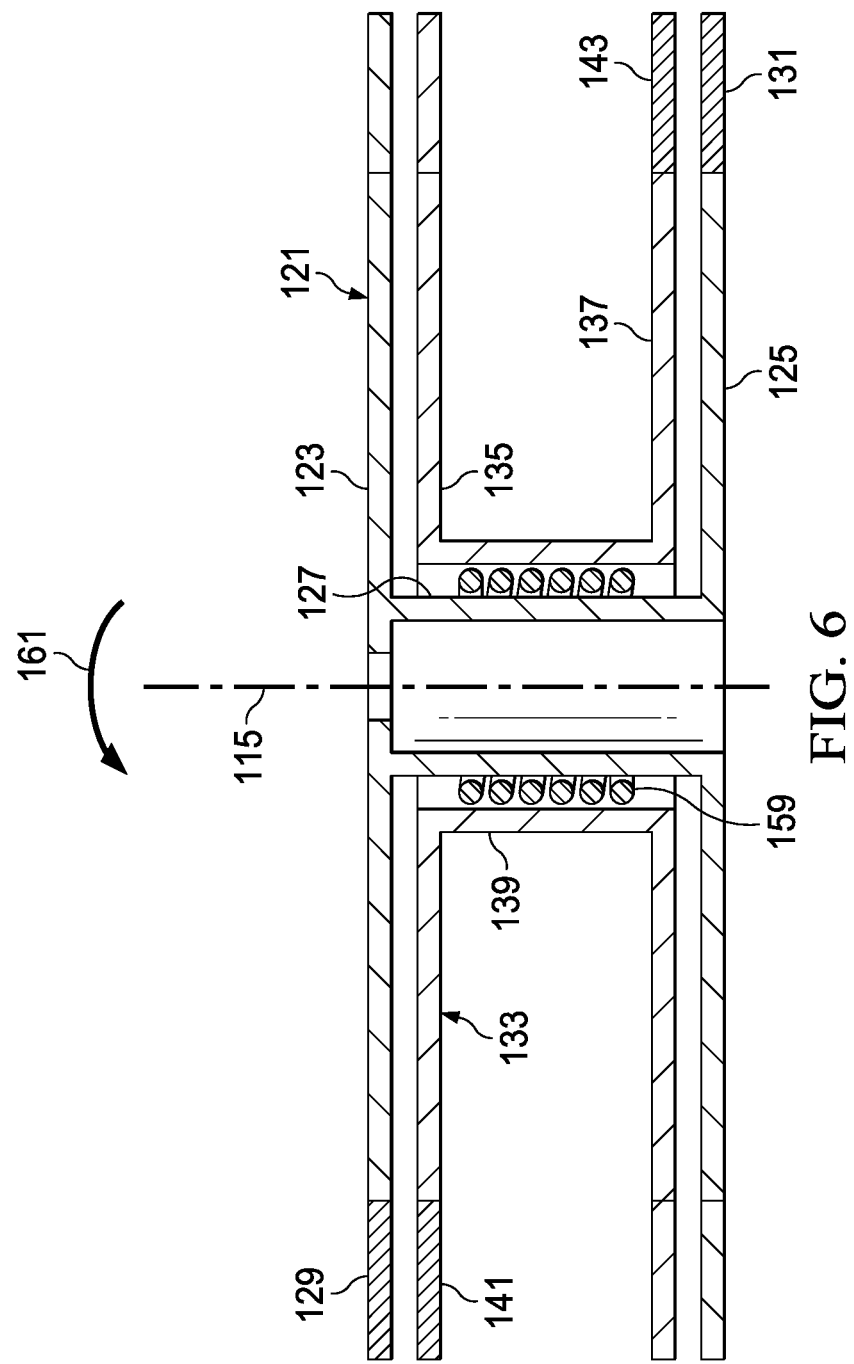
FIG. 6 is a simplified side cross-section view of the vibration attenuator of FIG. 1 in a maximum-moment configuration.

FIG. 3 through 6 illustrate details of the construction and use of an embodiment of attenuator 117, with FIG. 3 being an oblique exploded view, FIG. 4 being an oblique cutaway view, and FIGS. 5 and 6 being simplified side cross-section views showing attenuator 117 in a minimum-moment configuration and a maximum-moment configuration, respectively.

In the embodiment of FIGS. 3 through 6, attenuator 117 comprises two coaxial, dual-plane, spool-shaped spinners 121, 133, each having two opposing, balanced, eccentric weights. Spinners 121, 133 are coaxial with each other and mast axis 115. Attenuator 117 is designed to create an out of plane n/rev moment without creating a shear force. The masses in the two planes are physically coupled to each other to create the whirling couple, thus requiring only two motors or actuators to control the phase and magnitude of the generated moment. This is a simpler apparatus when compared to prior art moment generators in which the masses are not physically coupled to each other and require four actuators or motors to control the moment couple.

First spinner 121 comprises upper disk 123, lower disk 125, and drum 127 fixedly coupling disks 123, 125 to each other and spacing disks 123, 125 a selected distance h1 from each other. Disks 123, 125 rotate together with drum 127 about mast axis 115. Upper disk 123 has an upper weight 129 with a center of gravity located a selected distance r1 from mast axis 115, and lower disk 125 has a lower weight 131 also with a center of gravity located a selected distance r1 from mast axis 115, but lower weight 131 is angularly positioned 180 degrees from upper weight 129 about mast axis 115. In the embodiment shown, weights 129, 131 are disk-shaped and have a thickness generally equal to the thickness of disks 123, 125.

Second spinner 133 is constructed similarly to spinner 121 and comprises upper disk 135, lower disk 137, and drum 139. Drum 139 fixedly couples disks 135, 137 to each other and spaces disks 135, 137 a selected distance h2 from each other. Disks 135, 137 rotate together with drum 139 about mast axis 115. Upper disk 135 has an upper weight 141 with a center of gravity located a selected distance l2 from mast axis 115, and lower disk 137 has a lower weight 143 also with a center of gravity located a selected distance l2 from mast axis 115, but lower weight 143 is angularly positioned 180 degrees from upper weight 141 about mast axis 115. In the embodiment shown, r1 and r2 are equal, though they may be unequal in other embodiments. Weights 141, 143 are disk-shaped and have a thickness generally equal to the thickness of disks 135, 137. Though weights 129, 131, 141, 143 are shown and described as discrete disk-shaped components carried by spinners 121, 133, weights 129, 131, 141, 143 may alternatively be regions of disks 123, 125, 135, 137 configured to have more mass than equally sized regions of the remainder of the associated disk, such as regions having increased thickness or formed to have a greater density.

Spinners 121, 133 are rotatably carried within a housing 145, and a cover 147 is mounted to an upper flange of housing 145 for enclosing the volume containing spinners 121, 133. Housing 145 is fixedly mounted to a plate 149, which is fixedly mounted to yoke 119 (FIG. 2) and mast 113, for rotation together with mast 113 about mast axis 115.

Spinners 121, 133 are free to rotate about mast axis 115 relative to housing 145 and free to rotate at least a limited amount relative to each other. For example, spinners 121, 133 may be rotated at a rate of 3/rev relative to mast 113 (4/rev relative to fuselage 103). Bearings 151 allow for rotation of spinner 121 relative to housing 145, and bearings 153 allow for rotation of spinner 133 relative to spinner 121. An inner electric motor 155 is configured to cause rotation of spinner 121 relative to housing 145 (and yoke 119), and an outer electric motor 157 is configured to cause at least limited rotation of spinner 133 relative to spinner 121. An optional torsion spring 159 is coupled at each end of spring 159 to one of spinners 121, 133 for biasing spinner 133 toward a selected rest position, which is shown in FIG. 5.

In the rest position, which is the minimum-moment configuration, spinners 121, 133 are angularly positioned relative to each other to align upper weight 129 of spinner 121 and lower weight 143 of spinner 133 and to align upper weight 141 of spinner 133 and lower weight 131 of spinner 121. As spinners 121, 133 rotate together relative to yoke 119 and blades 111 while remaining in the rest position, no shear force and little or no moment is generated by spinners 121, 133. This is due to the generally equal distribution of the mass of weights 129, 131, 141, 143 about mast axis 115.

To generate moment 161, as spinners 121, 133 rotate together, spinner 133 is rotated a selected amount about mast axis 115 relative to spinner 121, thereby moving weights 129, 131, 141, 143 from their alignment in the rest position. FIG. 6 shows spinner 133 rotated relative to spinner 121 by 180 degrees from the rest orientation, and this position is the maximum-moment configuration. In this configuration, upper weights 129, 141 are aligned and lower weights 131, 143 are aligned. The vertical distances h1, h2 between upper weights 129, 141 and lower weights 131, 143 and the horizontal distances r1, r2 between weights 129, 131, 141, 143 and mast axis 115 generate moment 161, which whirls about mast axis 115 at the same rate as spinners 121, 133 rotate relative to mast 113.

It should be noted that spinner 133 may be rotated a selected amount less than the 180-degree rotation for the maximum-moment configuration for producing a moment between the minimum and maximum values. Also, the maximum moment that can be generated (and the moment produced for a given phase angle between spinners 121, 133) is dependent on the selected values for the mass of weights 129, 131, 141, 143, heights h1, h2, and radial distances r1, r2 of the centers of gravity from mast axis 115.

Attenuator 117 may operate in a passive manner or be partially or fully actively controlled. In a passive mode without using motors 155, 157, operation of rotor 109 will generate a moment, and spinners 121, 133 will rotate relative to mast 113 and to each other to seek a balancing moment if the spring rate (force per degree of phase) of spring 159 is properly chosen through tuning. For a semi-active mode, motor 155 will rotate spinner 121, and the phasing between spinners 121, 133 will be controlled with spring 159. In a fully active mode, motor 155 rotates spinner 121, and motor 157 is used to control the phasing between spinners 121, 133 to optimize the vibration reduction. The semi- and fully active modes may be operated in response to output from sensors (not shown), such as accelerometers, carried on rotor 109 and/or on fuselage 103.

In a typical application, attenuator 117 is optimized for a single frequency, but operating attenuator 117 in a semi- or fully active mode may allow for optimum function at a selected frequency and for attenuator 117 to be operated at other frequencies, for example, for use in a "whisper" mode of operation of a rotor.

FIGS. 7 through 10 illustrate another embodiment of a vibration attenuator according to this disclosure. Attenuator 201 is configured for use on an aircraft, such as helicopter 101, as an alternative to attenuator 117, described above.

Figure 7:
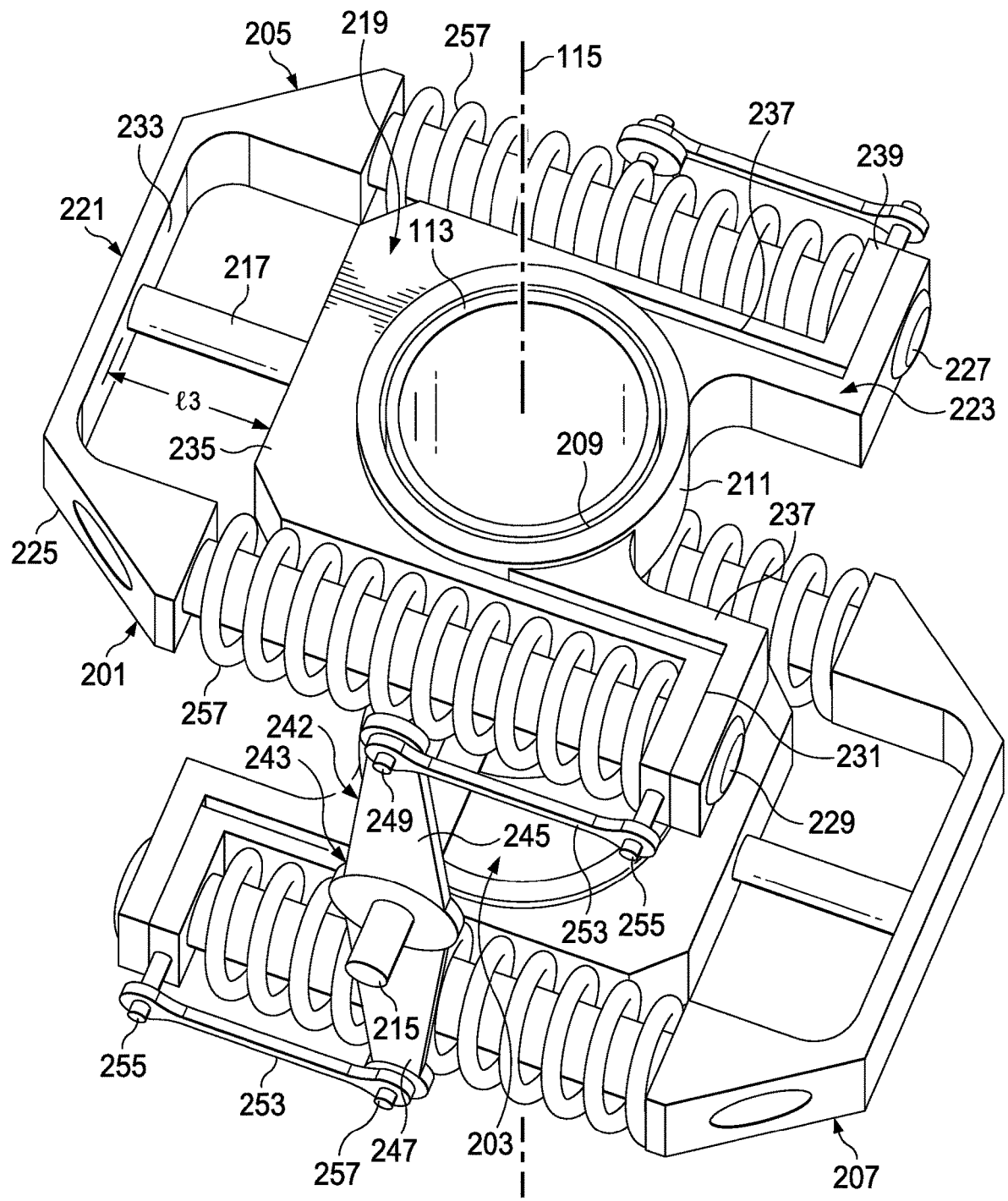
FIG. 7 is an oblique view of another embodiment of a vibration attenuator according to this disclosure and shown in a minimum-moment configuration.
Figure 8:
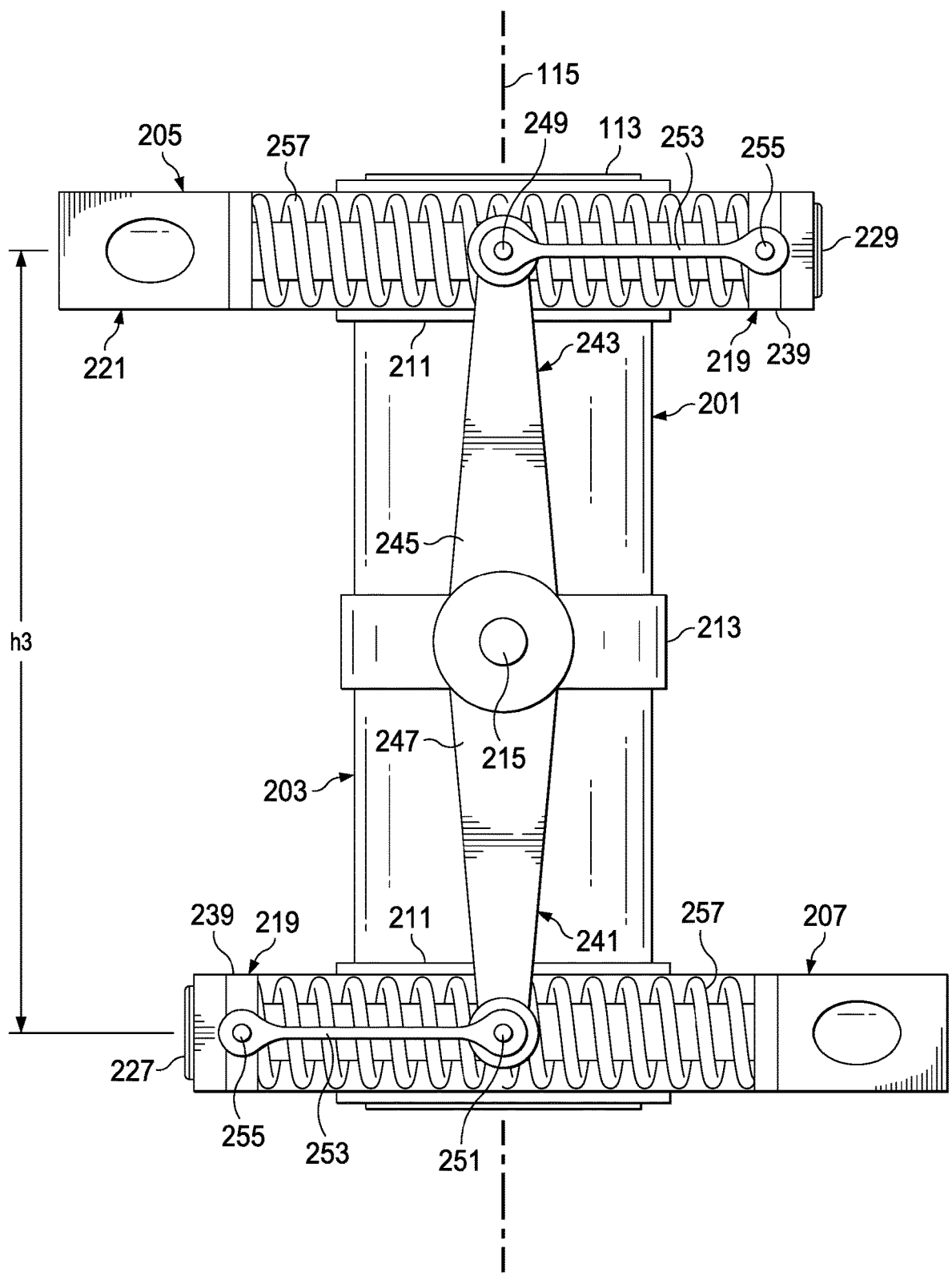
FIG. 8 is a side view of the attenuator of FIG. 7 shown in the minimum-moment configuration.
Figure 9:
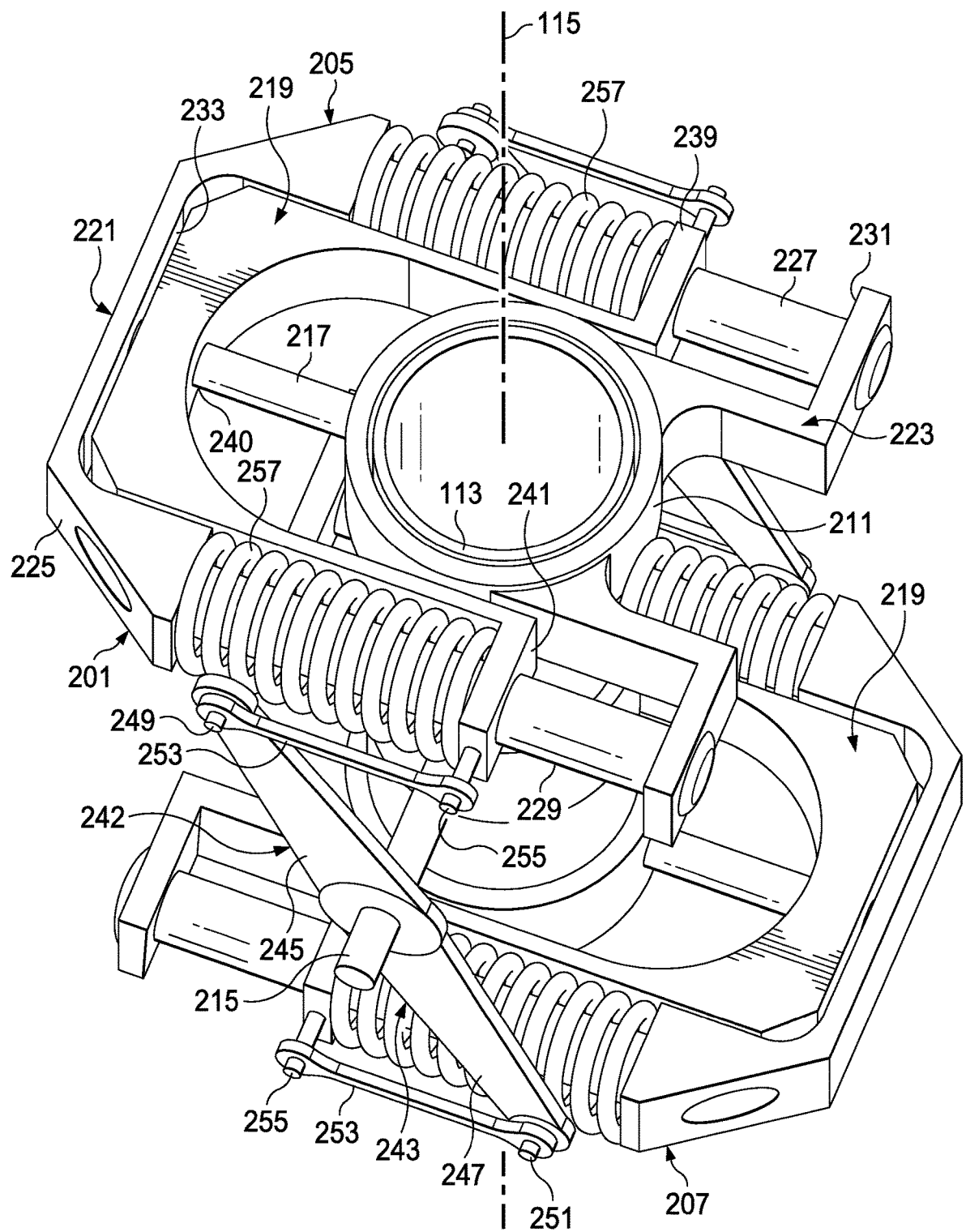
FIG. 9 is an oblique view of the attenuator of FIG. 7 shown in the maximum-moment configuration.
Figure 10:
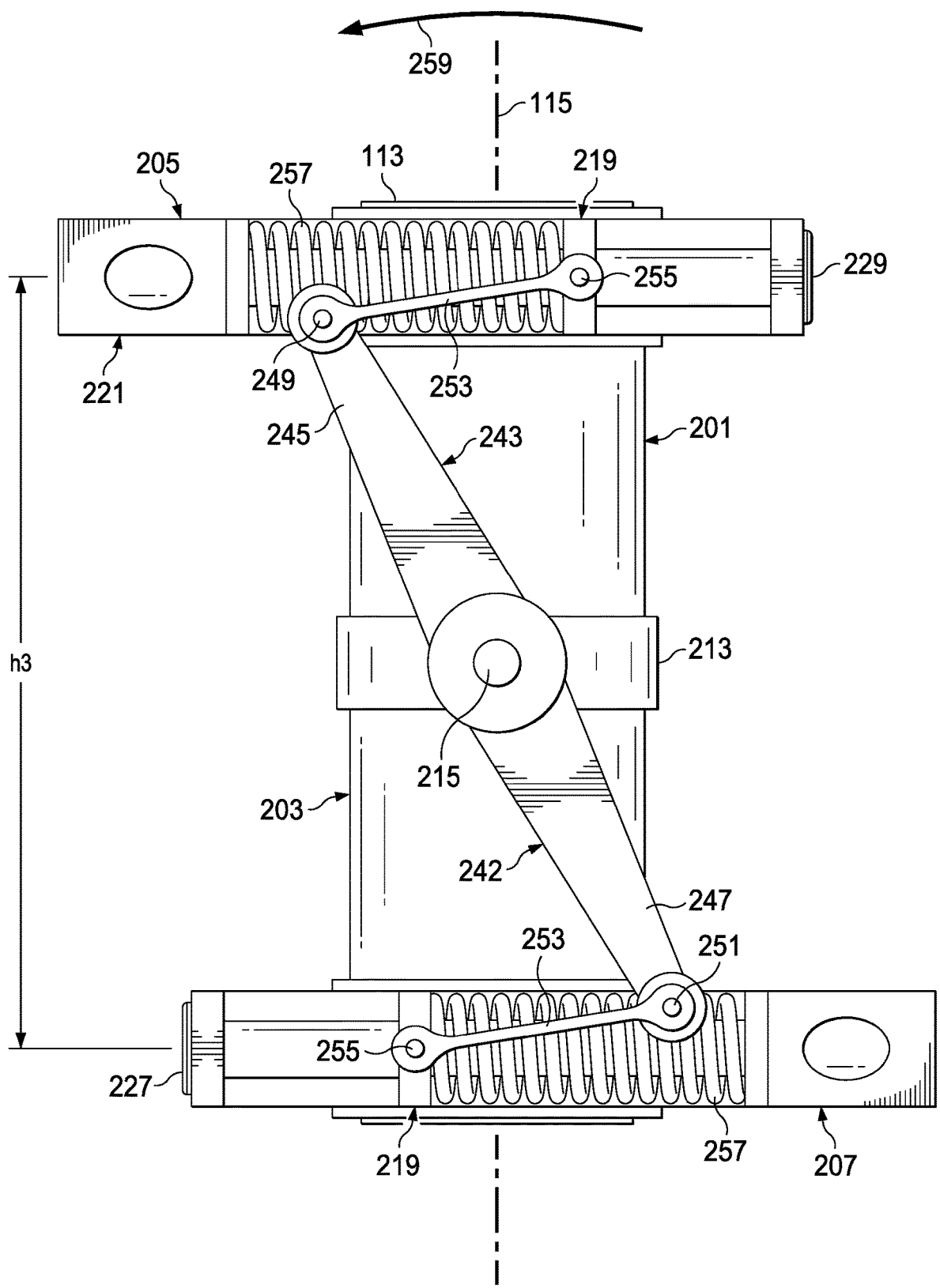
FIG. 10 is a side view of the attenuator of FIG. 7 shown in the maximum-moment configuration.

Like attenuator 117, attenuator 201 is configured to produce a variable moment couple to oppose a bending moment on mast 113 created during operation of rotor 109. Unlike attenuator 117, attenuator 201 has variable-radius weights that are controllable to position them at a selected radius relative to the mast axis 115. FIGS. 7 and 8 show attenuator 201 in a minimum- or zero-moment rest position, whereas FIGS. 9 and 10 show attenuator in a maximum-moment position.

Attenuator 201 comprises a cylindrical central core 203 and weight assemblies 205, 207 at each end of core 203. Core 203 has a bore 209 for receiving mast 113 or a standpipe (not shown), and attenuator 201 is preferably free to rotate about mast axis 115 relative to fuselage 103 of helicopter 101 and relative to mast 113 and rotor 109. In the embodiment shown, a motor ring 211 is located on each end of core 203, providing for redundancy, as only one motor ring 211 is needed to drive attenuator 201. However, attenuator 201 may comprise only one motor ring 211 or a motor having another configuration. A central pivot mount 213 is located at the midpoint of core 203. Pivot mount 213 comprises pivot shafts 215 that extend radially on opposing sides of mount 213, and motor rings 211 each have a central shaft 217 protruding radially and angularly positioned to be 90 degrees from each pivot shaft 215 and 180 degree from each other.

Weight assemblies 205, 207, as described below, are preferably formed from identical components, and each assembly 205, 207 preferably has identical components on each side of a vertical plane intersecting mast axis 115. Weight assemblies 205, 207 each comprise a U-shaped weight 219 translatable relative to a frame 221, and frame 221 comprises a section 223 mounted to motor ring 211 and a section 225 coupled to section 223 by shafts 227, 229. Section 223 comprises two L-shaped brackets, each having a stop surface 231 where shafts 227, 229 are attached to section 223. Section 225 comprises a U-shaped bracket having a stop surface 233 where the outer end of shaft 217 is attached to section 225.

Weight 219 comprises a high-mass portion 235, parallel bars 237 extending from portion 235 on opposite sides of motor ring 211, and tabs 239 extending from the ends of bars 237. Portion 235 has a bore 240 for slidingly receiving shaft 217, and each tab 239 has a bore 241 for slidingly receiving an associated shaft 227, 229. With this configuration, weight 219 can translate a limited amount along shafts 217, 227, 229 relative to frame 221 and core 203 between a rest position, as shown in FIGS. 7 and 8, and a maximum position, as shown in FIGS. 9 and 10. In the rest position, the center of gravity of each weight 219 is located approximately on mast axis 115, whereas any position other than the rest position locates the center of gravity of each weight 219 a radial distance from mast axis 115. Stop surfaces 231 engage tabs 239 to limit the motion of weight 219 toward core 203, and stop surface 233 engages portion 235 to limit the motion of weight 219 away from core 203 to a maximum distance of l3.

A pair of linkages 242 on opposite sides of core 203 couple weights 219 of assemblies 205, 207, and this ensures that weights 219 are always positioned at the same selected radial distance relative to core 203. In each linkage 242, a bellcrank 243 comprises two equal-length arms 245, 247 and is pivotally mounted to pivot shaft 215. A shaft 249 is located at the end of arm 245, and a shaft 251 is located at the end of arm 247. Each shaft 249, 251 is pivotally coupled by a link 253 to an associated shaft 255 extending from tab 239.

In the preferred embodiment, weights 219 are biased toward the rest position by a biasing device, such as elastic coil springs 257, which exert a biasing force between tabs 239 and outer section 225 of frame 221. Alternatively, weights 219 may be biased by another type of elastic spring or by another type of biasing device, such as a pneumatic, hydraulic, or elastomeric biasing device. In other embodiments, attenuator 201 may lack springs, with weights 219 being moved solely under the influence of forces encountered during operation, with attenuator 201 configured for self-tuning.

Linkages 242 provide for equal translation of weights 219 along parallel planes spaced from each other along mast axis 115 by a height h3. When weights 219 are in the rest position, the center of gravity of each weight 219 is preferably located approximately on mast axis 115, and this configuration creates little or no shear forces or moments. However, as weights 219 are moved radially outward from core 203, a couple is created due to the 180-degree angular orientation of weights 219 and the difference in height of weights 219. This couple creates moment 259.

Attenuator 201 may be rotated relative to mast 113 with motors located in motor rings 211 or by other means, such as a gear coupling to mast 113. Alternatively, attenuator 201 may be passive, such that the forces encountered during operation cause the desired rotation. One or more motors (not shown) may be configured to cause selective positioning of weights 219 along shafts 217. For example, the motor(s) may act on bellcranks 243 to rotate them, or one shaft 217 may be replaced with a jackscrew rotated by a motor and engaging threads in the associated weight 219 for causing translation of weights 219.

Figure 11:
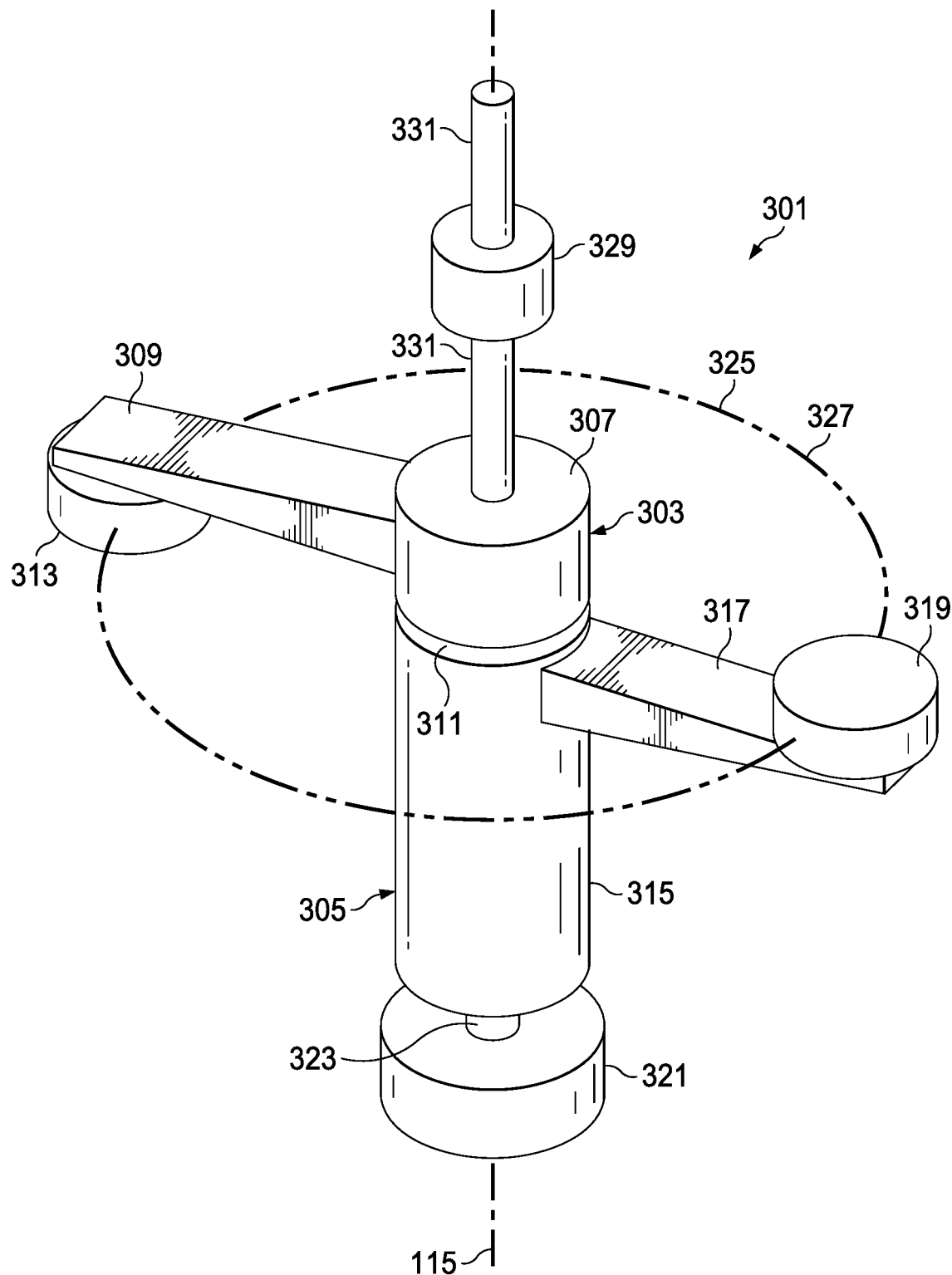
FIG. 11 is an oblique view of another embodiment of a vibration attenuator according to this disclosure and shown in a minimum-moment configuration.
Figure 12:
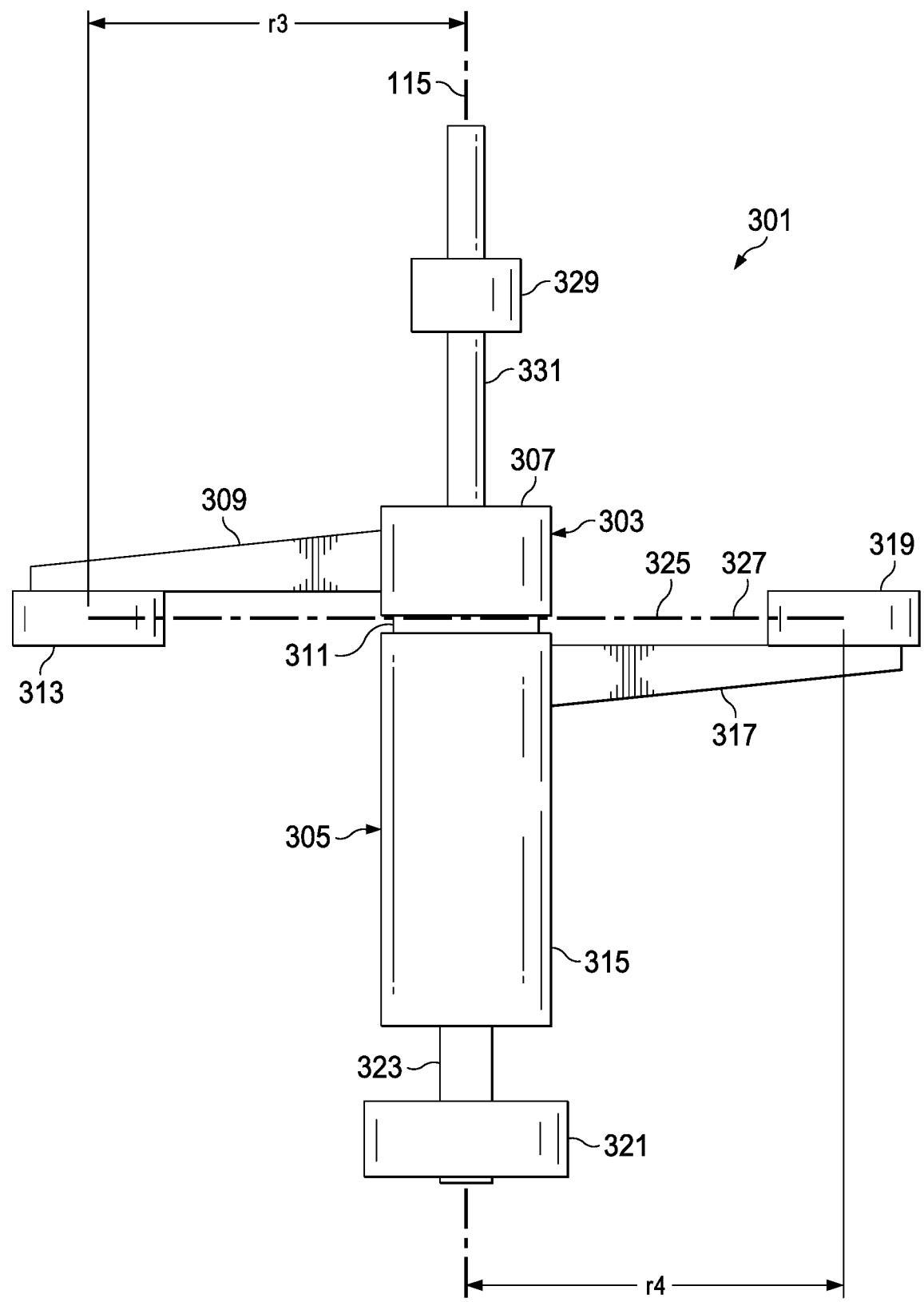
FIG. 12 is a side view of the attenuator of FIG. 11 shown in the minimum-moment configuration.
Figure 13:
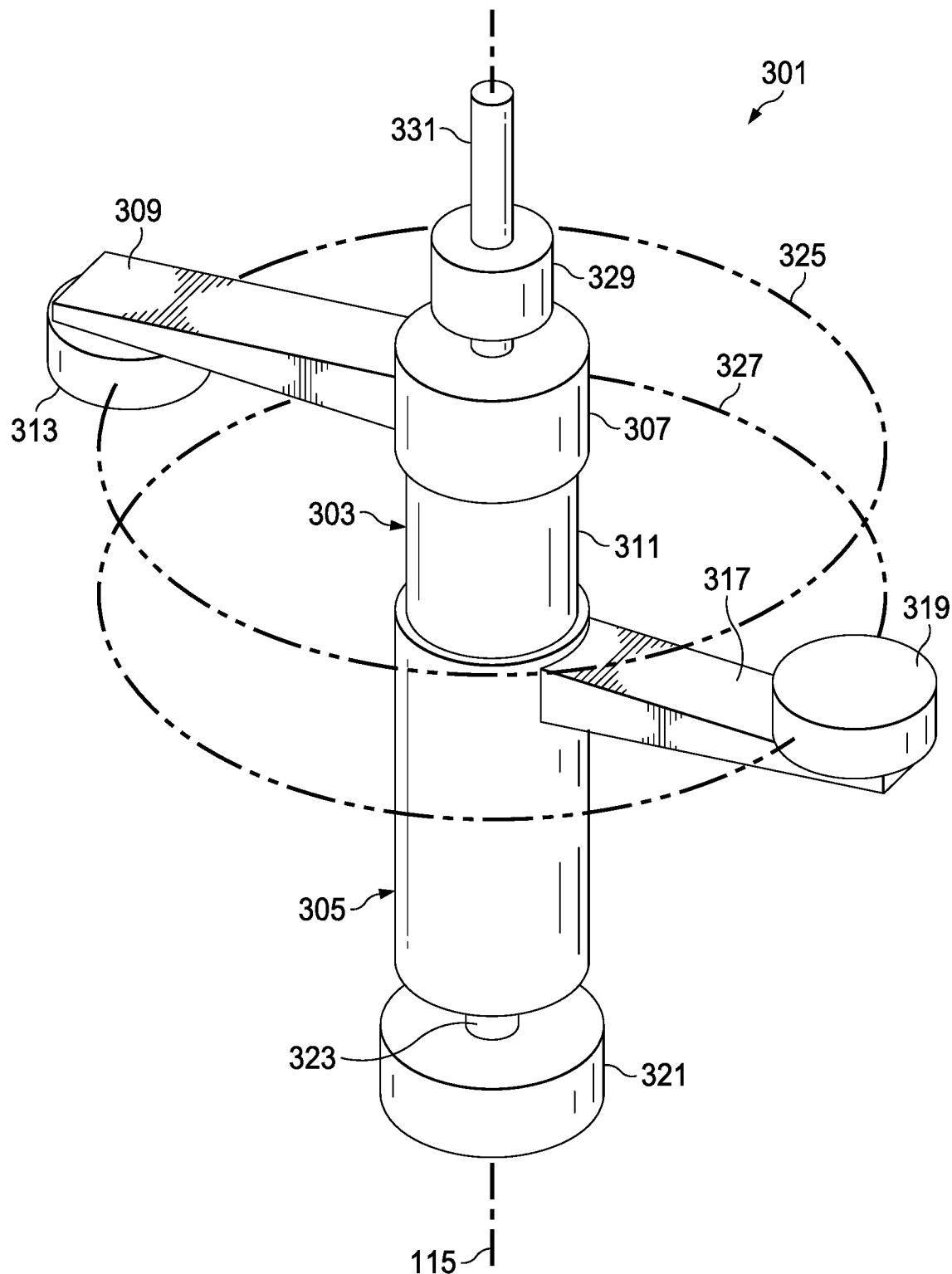
FIG. 13 is an oblique view of the attenuator of FIG. 11 shown in the maximum-moment configuration.
Figure 14:
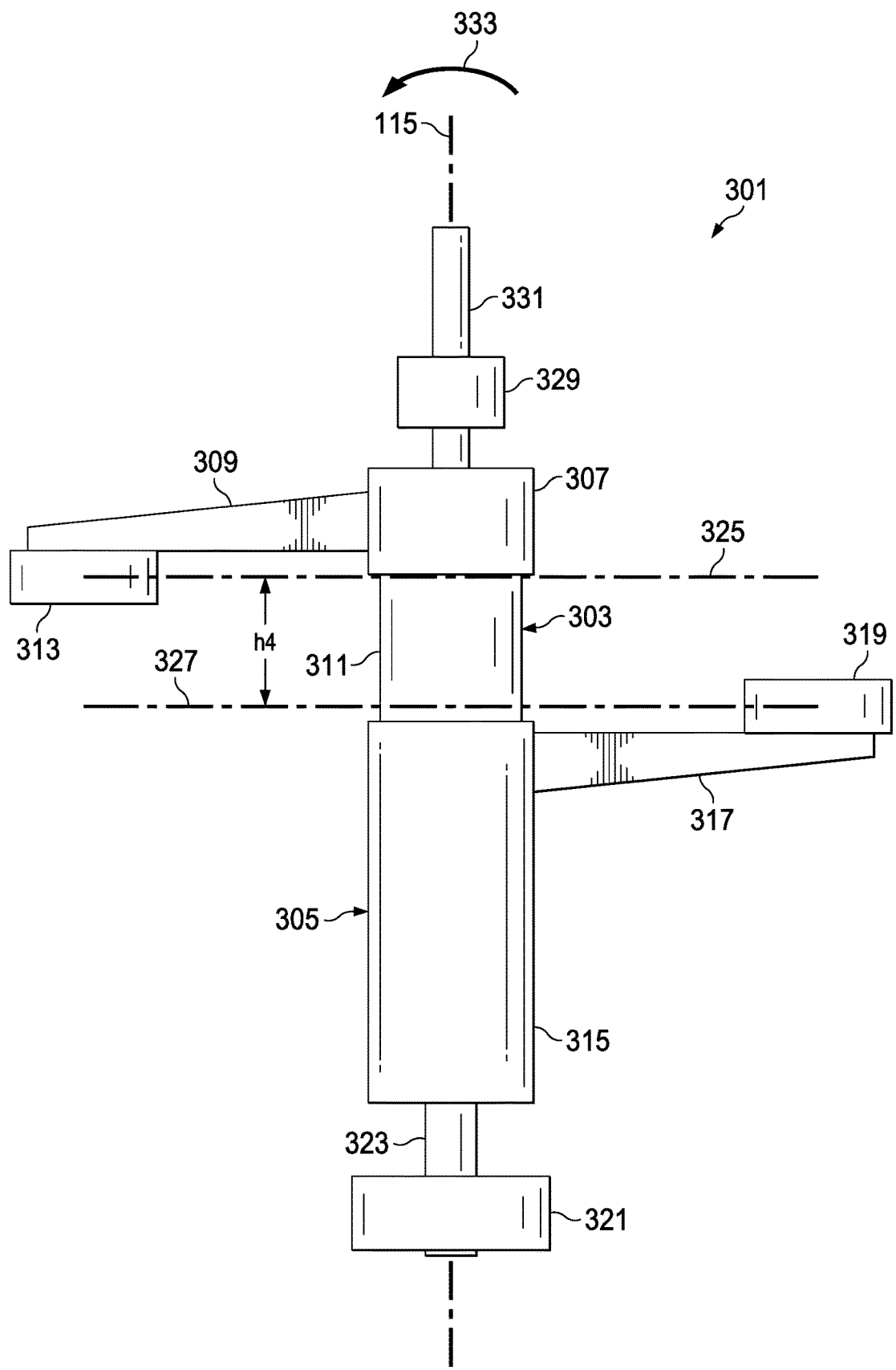
FIG. 14 is a side view of the attenuator of FIG. 11 shown in the maximum-moment configuration.

FIGS. 11 through 14 illustrate another embodiment of a vibration attenuator according to this disclosure. Attenuator 301 is configured for use on an aircraft, such as helicopter 101, as an alternative to attenuator 117, described above. Like attenuators 117, 201, attenuator 301 is configured to produce a variable moment couple to oppose a bending moment on mast 113 created during operation of rotor 109. Attenuator 301 has fixed-radius weights, and at least one of the weights is controllable to position it for revolving at a selected height along mast axis 115. FIGS. 11 and 12 show attenuator 301 in a minimum- or zero-moment rest configuration, whereas FIGS. 13 and 14 show attenuator 301 in a maximum-moment configuration.

Attenuator 301 comprises upper weight assembly 303 and lower weight assembly 305, assemblies 303, 305 configured to rotate together about mast axis 115 at an angular velocity selected to match the velocity of a whirling moment created during operation of an aircraft rotor.

In the embodiment shown, weight assembly 303 comprises center section 307 and arm 309 extending radially from section 307. A reduced-diameter section 311 depends from center section 307, and a weight 313 is located on arm 309 with its center of gravity a radial distance r3 from axis 115.

Weight assembly 305 comprises center section 315 and arm 317 extending radially from section 315. Center section 315 is elongated and tubular, allowing for section 311 of assembly 303 to be translatably carried within center section 315. A weight 319 is located on arm 317 with its center of gravity located a radial distance from r4 from axis 115. The mass of weight 313 is equal to the mass of weight 319, and r3 is preferably equal to r4. Though shown as discrete weights 313, 319 installed on arms 309, 317, respectively, weights 313, 319 may be of other configurations, such as, for example, integral sections of arms 309, 317.

As mentioned above, weight assemblies 303, 305 rotate together about mast axis 115, and arms 309, 317 and weights 313, 319 are orientation to be 180 degrees from each other about mast axis 115. To maintain this relative angular orientation, reduced-diameter section 311 of assembly 303 and center section 315 of assembly 305 may comprise, for example, cooperating features (not shown), such as, for example, key and slot, detent and relief, or splines. Maintaining the angular orientation in this or other manner allows a motor, such as electric motor 321, to drive a shaft 323 connected to center section 315 for rotating both assemblies 303, 305 together about mast axis 115.

The centers of gravity of weights 313, 319 revolve about axis 115 in circular paths, shown in broken lines as path 325 for weight 313 and path 327 for weight 319. In the zero-moment configuration, as shown in FIGS. 11 and 12, paths 325, 327 are coplanar, resulting in weights 313, 319 producing equal and opposite forces that cancel each other. However, weight assembly 303 is translatable along mast axis 115 relative to weight assembly 305 by operating a motor, such as electric motor 329, to move a shaft 331 connected to center section 307. As shaft 331 is translated relative to motor 329, weight assembly 303 is translated along mast axis 115 relative to assembly 305. Motor 329 may be, for example, a linear motor or may be a rotating motor for engaging threads on shaft 331.

As shown in FIGS. 13 and 14, as weight assembly 303 is moved away from the rest position shown in FIGS. 11 and 12, circular path 325 moves from the coplanar orientation with path 327. This positions the center of gravity of weight 313 a selected height h4 above the center of gravity of weight 319, and weights 313, 319 produce a whirling moment 333 as they revolve about axis 115. Attenuator 301 is shown in the maximum-moment configuration in FIGS. 13 and 14, though it should be noted that weight assembly 303 may be moved to any selected height h4 between the minimum-moment coplanar configuration and the maximum-height, maximum-moment configuration.

At least one embodiment is disclosed, and variations, combinations, and/or modifications of the embodiment(s) and/or features of the embodiment(s) made by a person having ordinary skill in the art are within the scope of this disclosure. Alternative embodiments that result from combining, integrating, and/or omitting features of the embodiment(s) are also within the scope of this disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 95 percent, 98 percent, 99 percent, or 100 percent. Moreover, any numerical range defined by two R numbers as defined in the above is also specifically disclosed.

Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention. Also, the phrases "at least one of A, B, and C" and "A and/or B and/or C" should each be interpreted to include only A, only B, only C, or any combination of A, B, and C.

What is claimed is:

1. A vibration attenuator for an aircraft having a rotor rotating about a mast axis, the attenuator comprising:

first and second coaxial spinners configured for rotation about the mast axis and relative to the rotor, each spinner having an upper weight and a lower weight, the weights of each spinner being spaced radially from the mast axis and positioned 180 degrees from each other about the mast axis, the weights of each spinner being spaced from each other a distance parallel to the mast axis, such that each weight rotates about the mast axis in a plane different from each of the other weights;

wherein one of the spinners is located within the other of the spinners;

wherein the spinners are configured to be rotated together relative to the rotor at a selected angular rate; and wherein the spinners are selectively rotatable relative to each other between a minimum-moment configuration, in which the upper weight of each spinner is angularly aligned about the mast axis with the lower weight of the other spinner, and a maximum-moment configuration, in which the upper weights are angularly aligned about the mast axis and the lower weights are angularly aligned about the mast axis, thereby producing a whirling moment about the mast axis as the spinners rotate about the mast axis.

2. The vibration attenuator of claim 1, further comprising:
   a housing enclosing the spinners, the housing being adapted for coupling to the rotor, the spinners being configured for rotation relative to the housing.

3. The vibration attenuator of claim 1, wherein the weights are discrete components installed on the spinners.

4. The vibration attenuator of claim 1, wherein the weights are regions of the spinners having increased density.

5. The vibration attenuator of claim 1, wherein the weights are regions of the spinners having increased thickness.

6. The vibration attenuator of claim 1, wherein each spinner comprises a drum and two disks, the disks being coupled to opposite ends of the drum, the weights being located in the disks.

7. The vibration attenuator of claim 1, further comprising:
   a first motor for causing rotation of the first spinner; and
   a second motor for causing rotation of the second spinner.

8. A vibration attenuator for an aircraft having a rotor rotating about a mast axis, the attenuator comprising:

first and second coaxial spinners configured for rotation about the mast axis and relative to the rotor, each spinner having an upper weight and a lower weight, the weights of each spinner being spaced radially from the mast axis and positioned 180 degrees from each other about the mast axis, the weights of each spinner being spaced from each other a distance parallel to the mast axis, such that each weight rotates about the mast axis in a plane different from each of the other weights;

wherein each spinner comprises a drum and two disks, the disks being coupled to opposite ends of the drum, the weights being located in the disks;

wherein the spinners are configured to be rotated together relative to the rotor at a selected angular rate; and wherein the spinners are selectively rotatable relative to each other between a minimum-moment configuration, in which the upper weight of each spinner is angularly aligned about the mast axis with the lower weight of the other spinner, and a maximum-moment configuration, in which the upper weights are angularly aligned about the mast axis and the lower weights are angularly aligned about the mast axis, thereby producing a whirling moment about the mast axis as the spinners rotate about the mast axis.

9. The vibration attenuator of claim 8, wherein one of the spinners is located within the other of the spinners.

10. The vibration attenuator of claim 8, further comprising:
a first motor for causing rotation of the first spinner; and
a second motor for causing rotation of the second spinner.

11. The vibration attenuator of claim 8, further comprising:
a housing enclosing the spinners, the housing being adapted for coupling to the rotor, the spinners being configured for rotation relative to the housing.

12. The vibration attenuator of claim 8, wherein the weights are discrete components installed on the spinners.

13. The vibration attenuator of claim 8, wherein the weights are regions of the spinners having increased density.

14. The vibration attenuator of claim 8, wherein the weights are regions of the spinners having increased thickness.

15. A vibration attenuator for an aircraft having a rotor rotating about a mast axis, the attenuator comprising:
first and second coaxial spinners configured for rotation about the mast axis and relative to the rotor, each spinner having an upper weight and a lower weight, the weights of each spinner being spaced radially from the mast axis and positioned 180 degrees from each other about the mast axis, the weights of each spinner being spaced from each other a distance parallel to the mast axis, such that each weight rotates about the mast axis in a plane different from each of the other weights;
a first motor for causing rotation of the first spinner; and
a second motor for causing rotation of the second spinner
wherein the spinners are configured to be rotated together relative to the rotor at a selected angular rate; and
wherein the spinners are selectively rotatable relative to each other between a minimum-moment configuration, in which the upper weight of each spinner is angularly aligned about the mast axis with the lower weight of the other spinner, and a maximum-moment configuration, in which the upper weights are angularly aligned about the mast axis and the lower weights are angularly aligned about the mast axis, thereby producing a whirling moment about the mast axis as the spinners rotate about the mast axis.

16. The vibration attenuator of claim 15, wherein one of the spinners is located within the other of the spinners.

17. The vibration attenuator of claim 15, wherein each spinner comprises a drum and two disks, the disks being coupled to opposite ends of the drum, the weights being located in the disks.

18. The vibration attenuator of claim 15, further comprising:
a housing enclosing the spinners, the housing being adapted for coupling to the rotor, the spinners being configured for rotation relative to the housing.

19. The vibration attenuator of claim 15, wherein the weights are discrete components installed on the spinners.

20. The vibration attenuator of claim 15, wherein the weights are regions of the spinners having increased density.

21. The vibration attenuator of claim 15, wherein the weights are regions of the spinners having increased thickness.

* * * * *